(12) United States Patent
Gillum et al.

(10) Patent No.: US 7,996,900 B2
(45) Date of Patent: Aug. 9, 2011

(54) TIME TRAVELLING EMAIL MESSAGES AFTER DELIVERY

(75) Inventors: Eliot Carleton Gillum, Mountain View, CA (US); Krishna Charan Vitaldevara, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 12/048,587

(22) Filed: Mar. 14, 2008

(65) Prior Publication Data
US 2009/0234865 A1 Sep. 17, 2009

(51) Int. Cl.
*G06F 11/00* (2006.01)
(52) U.S. Cl. .......................................................... 726/23
(58) Field of Classification Search ............... 726/23–26; 709/206, 207; 713/165, 167, 188
See application file for complete search history.

(56) References Cited

U.S. PATENT DOCUMENTS

| | | | |
|---|---|---|---|
| 5,377,354 A | 12/1994 | Scannell et al. | |
| 5,850,520 A | 12/1998 | Griebenow et al. | |
| 6,311,210 B1 * | 10/2001 | Foladare et al. | 709/206 |
| 6,330,590 B1 | 12/2001 | Cotten | |
| 6,725,228 B1 | 4/2004 | Clark et al. | |
| 7,206,814 B2 | 4/2007 | Kirsch | |
| 7,222,159 B2 | 5/2007 | Miller et al. | |
| 7,272,853 B2 | 9/2007 | Goodman et al. | |
| 7,277,695 B2 | 10/2007 | Petry et al. | |
| 7,308,478 B2 * | 12/2007 | Kawaguchi et al. | 709/206 |
| 7,683,285 B2 * | 3/2010 | Haselberger et al. | 209/584 |
| 2003/0212566 A1 | 11/2003 | Fergusson et al. | |
| 2004/0017899 A1 | 1/2004 | Garfinkel et al. | |
| 2004/0122730 A1 | 6/2004 | Tucciarone et al. | |
| 2004/0128321 A1 | 7/2004 | Hamer | |
| 2004/0177120 A1 | 9/2004 | Kirsch | |
| 2005/0038863 A1 | 2/2005 | Onyon et al. | |
| 2005/0108337 A1 * | 5/2005 | Lorenz | 709/206 |
| 2005/0210272 A1 | 9/2005 | Fotta | |
| 2006/0288076 A1 | 12/2006 | Cowings et al. | |
| 2007/0208817 A1 | 9/2007 | Lund et al. | |

FOREIGN PATENT DOCUMENTS
WO  WO2005008983 A2 *  1/2005

OTHER PUBLICATIONS

Duan et al., "DMTP: Controlling Spam Through Message Delivery Differentiation," printed from http://www.cs.fsu.edu/research/reports/TR-041025.pdf, 10 pages, US.
Prakash et al., "A Reputation-Based Approach for Efficient Filtration of Spam," printed from http://www.anti-phishing.com/sponsors_technical_papers/cloudmark_reputation_filtration.pdf, 12 pages, Sep. 2005, Cloudmark, Inc., US.

* cited by examiner

*Primary Examiner* — Beemnet W Dada
(74) *Attorney, Agent, or Firm* — Senniger Powers LLP

(57) ABSTRACT

Systems and methods for reviewing email messages after delivery to an inbox. An inbox filter maintains a suspect list identifying of the email messages including unwanted content and identifies unread email messages in the inbox of the user. The inbox filter moves each identified unread email message to a suspect folder when the determined source of the identified unread email message is contained in the suspect list of sources.

20 Claims, 3 Drawing Sheets

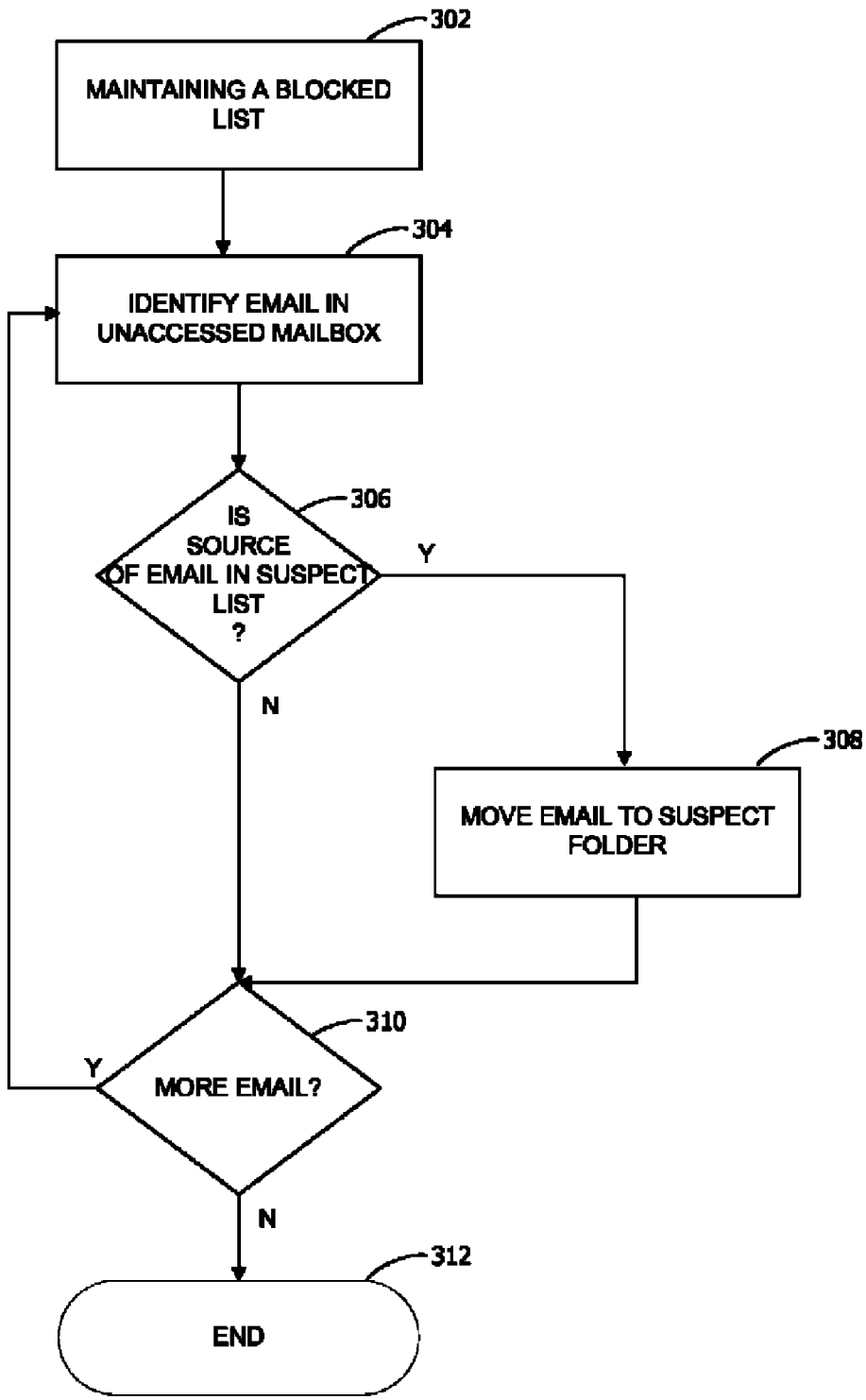

TIME TRAVELLING EMAIL MESSAGES AFTER DELIVERY

BACKGROUND

Typically, anti-spam systems make decisions on incoming email messages based on an originating internet protocol (IP) address. The decisions are based on the history of the IP address or the lack of a history for the IP address. Once a decision is made, the email message is either delivered to the user's inbox or appropriately catalogued as spam or as some other undesirable email message. Any information discovered about the IP address after the message is delivered is used to build the reputation of the IP address. For example, the reputation of the IP address may be based on user complaints, feedback loops or other sources. This reputation information is not used to catalogue previously delivered email messages, but is used to catalogue subsequently received email messages from the IP address.

SUMMARY

Embodiments of the invention overcome one or more vulnerabilities associated with failing to use information gathered on a source of an email message after delivery of the email message to an mailbox. Aspects of the invention include maintaining a suspect list identifying the sources of the unwanted email messages. In one embodiment, unseen email messages in the inbox are identified and each identified email message is moved from the inbox to a suspect folder if the determined source of the identified email message is contained in the suspect list of sources.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is an exemplary flow diagram for a method of reviewing a plurality of email messages stored in an unaccessed inbox.

Corresponding reference characters indicate corresponding parts throughout the drawings.

DETAILED DESCRIPTION

Figure 1:
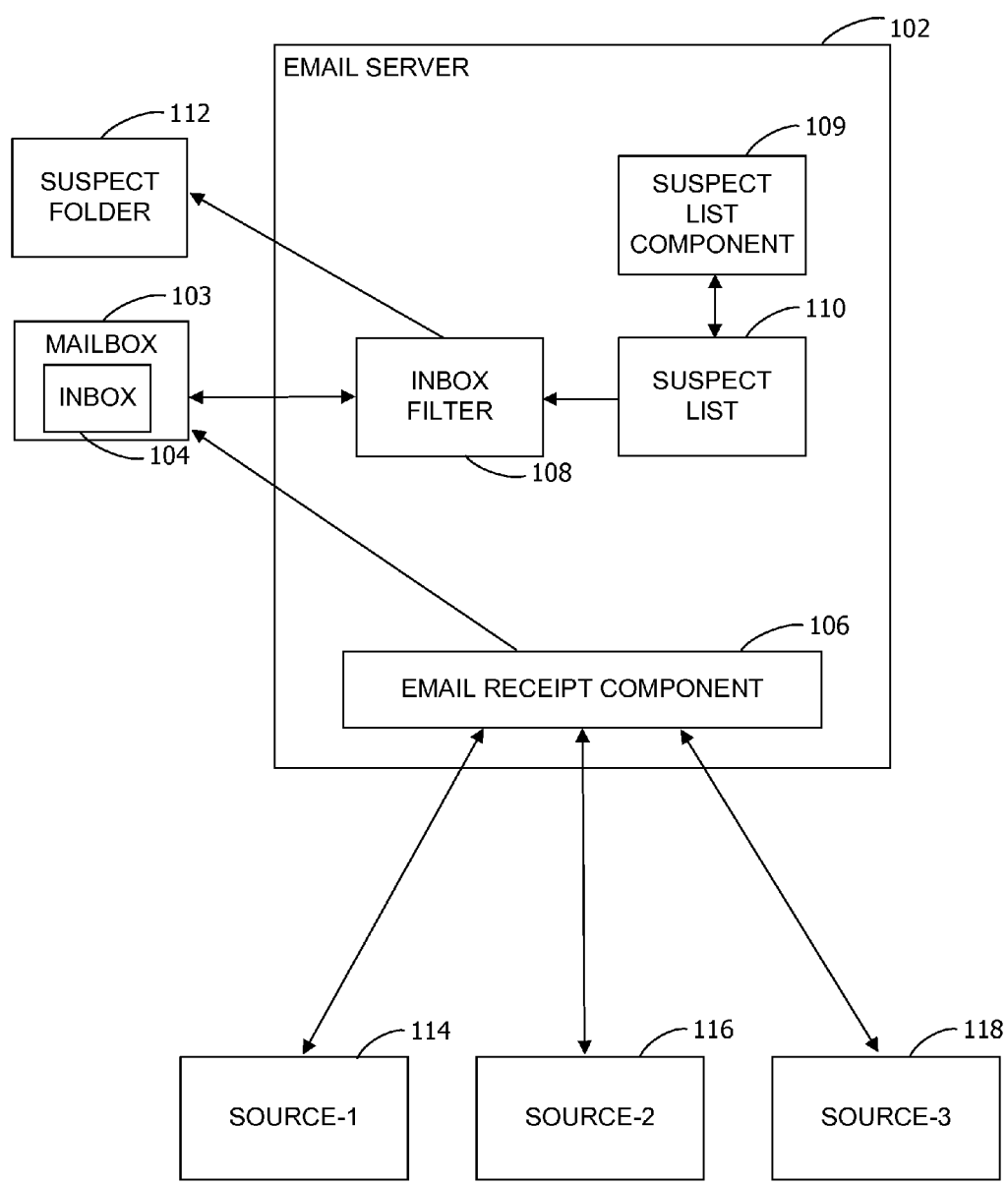
FIG. 1 is a block diagram illustrating one example of a suitable computing system environment in which the invention may be implemented.

Referring now to the drawings, aspects of the invention implement an email server for reviewing email messages after delivery to an inbox. Information may be discovered about the source of an email message after the message is delivered, but before the user is aware of the existence of the email message. Examples include email messages that have been delivered since the user last accessed the mailbox 103 or email messages that have not read, viewed, previewed, opened, or otherwise accessed by the user. If this new information regarding the source of the email message is not used to catalogue previously delivered email messages, the user may receive spam and other harmful email messages in their inbox. Thus, the system and method are called "time travel" because it appears that the system and method go back in time to remove unwanted mail from the user's inbox. Unwanted mail may be deleted from the user's inbox without the user ever observing a message autonomously disappearing.

FIG. 1 is a block diagram illustrating one example of a suitable computing system environment in which the invention may be implemented. An email server 102 includes an email receipt component 106, an inbox filter 108, and a suspect list component 109. The email receipt component 106 receives a plurality of email messages and stores the email messages in an inbox 104 of a user associated with (or integral with) the email server 102. In an embodiment, the inbox 104 is associated with a mailbox 103 of the user. In this embodiment, the mailbox 103 includes the email messages associated with the user and the inbox 104 of the mailbox 103 is the default location for newly recieved email messages. Embodiments include the user logging directly into the email server 102 to access the inbox 104 and the user utilizing email client software executing on a remote device to access the inbox 104.

The suspect list component 109 generates and maintains a suspect list 110 of sources (e.g., source-1 114, source-2 116, source-3 118). The reputations of sources in the suspect list 110 are determined to be undesirable based on information, such as user complaints and/or feedback loops. For example, in an embodiment, the reputation of the source is based on one or more of the following: user complaints, feedback loops or anti-spam technology indicating the message is spam, anti-virus technology indicating the message contains a virus, feedback loops or image recognition technology indicating the message contains pornography, feedback loops or anti-infringement technology indicating the message contains unauthorized copyrighted material, and feedback loops or anti-phishing technology indicating the message contains a phishing attack.

The inbox filter 108 identifies email messages that have been delievered since the user last saw their mailbox 103 and determines the source of the unseen email message. The inbox filter 108 displays the email message to the user to indicate the determined source of the identified email message is contained in the suspect list 110 of sources (e.g., source-1 114, source-2 116, source-3 118) (e.g., prefixing a subject line of the email message). Alternatively, the inbox filter 108 deletes the identified email message from the inbox 104 of the user when the determined source of the identified email message is contained in the suspect list 110 of sources (e.g., source-1 114, source-2 116, source-3 118). In another alternative, inbox filter 108 moves the identified email message to a junk folder (not shown). Advantageously, because the email messages are scanned at login, the process is transparent to the user, and, from the user's perspective, the message was never delivered to the inbox 104.

In an embodiment, the source of the email message is based on one or more of the following: an IP address associated with the email message, a URL contained in the email message, a subject of the email message, a source of the email message, keywords in the email message, hashes of all of a subset of the email message, a header of the email message, and a domain of a sender of the email message.

In an alternative embodiment, the inbox filter 108 monitors the user's actions relative to the inbox 104. When the monitoring indicates that the user has not read an email message in the inbox 104 of the user for a period of time, the inbox filter 108 identifies each email message stored in the inbox 104 of the user which is unseen by the user, determines the source of each of the identified email messages, and moves each identified email message to a suspect folder 112 when the determined source of the identified email message is contained in the suspect list 110 of sources as described above. For example, an unseen email message includes email messages that have not been read, viewed, displayed, previewed, opened, or otherwise accessed by the user of the inbox 104.

Alternatively, the inbox filter 108 periodically identifies each email message stored in the inbox 104 of the user which has not been read by the user in response to receiving a command from the user, in response to the monitoring by the inbox filter 108 indicating that the user has not composed or deleted an email message in the inbox 104 of the user for a period of time, and periodically in response to the monitoring by the inbox filter 108 indicating that user is no longer accessing the inbox 104. For example, the user may choose to have the inbox filter 108 identify email messages from sources in the suspect list 110 by issuing a command. The command may specify that inbox filter 108 is to identify the email messages on a one-time basis or on a periodic basis. In a further example, the inbox filter 108 may be configured to identify email messages from sources in the suspect list 110 when the user is not accessing the inbox 104 or active in the inbox 104 (e.g., the user has not composed or deleted an email message for a period of time). Advantageously, these alternative embodiments will not disrupt the user experience because the inbox 104 will remain in consistent state while the user is accessing the inbox 104 or the state of the inbox 104 will change in response to user-initiated command.

In another embodiment, the inbox filter 108 determines a read/view state of the email message. If the source (e.g., source-1 114, source-2 116, source-3 118) of the email message is contained in the suspect list 110 and the read/view state indicates that the email message has not been previously read or viewed by the user, the message is removed from the inbox 104. And, if the source of the email message is contained in the suspect list 110 and the read/view state indicates that the email message has been previously read or viewed by the user, the message is not removed from the inbox 104. Advantageously, this improves the user experience because previously viewed or read email messages will not be removed from the user's inbox 104 without user action.

Figure 2:
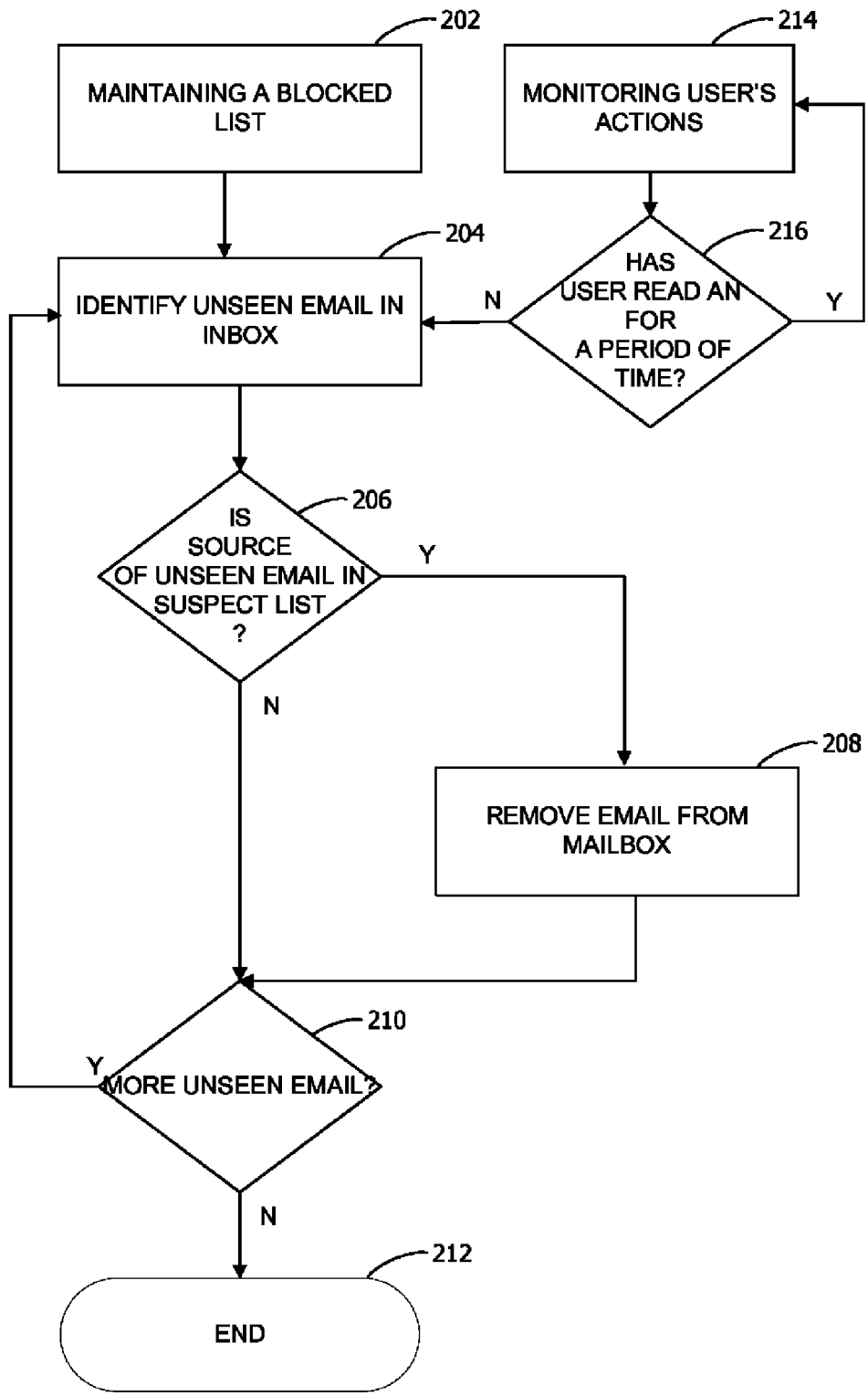
FIG. 2 is an exemplary flow diagram for a method of reviewing unseen email messages after delivery to an inbox.

FIG. 2 is an exemplary flow diagram for a method of reviewing email messages after delivery to inbox 104 of the user. At 202, the suspect list component 109 maintains a suspect list 110 of sources indicating a source (e.g., source-1 114, source-2 116, source-3 118) of the email message is a source of email messages including unwanted content. Unwanted content may include one or more of the following: spam, a virus, pornography, unauthorized copyrighted material, and a phishing attack. A phishing attack is an attempt to acquire sensitive information, such as usernames, passwords and credit card details, by masquerading as a desirable entity in an email message. In an embodiment, the suspect list 110 is based on a reputation of source and the reputation of source is based on the email messages sent by the source. In an embodiment, sources included in the suspect list 110 have sent email messages with unwanted content.

At 204, the inbox filter 108 identifies each email message stored in the inbox 104 that has not been seen by the user. In an alternative embodiment, the inbox filter 108 identifies unseen email message in the inbox 104 periodically during periods when the inbox 104 is not accessed. Examples of unseen email messages include email messages that have been delievered since the user has viewed, previewed, opened, or otherwise accessed the mailbox 103 or inbox 104 or email messages that have not read, viewed, previewed, opened, or otherwise accessed by the user.

At 206, the inbox filter 108 determines a source (e.g., source-1 114, source-2 116, source-3 118) associated with each identified email message. In an embodiment, the source associated with the email message is based on one or more of the following: an IP address associated with the email message, a URL contained in the email message, a subject of the email message, a source of the email message, keywords in the email message, hashes of all of a subset of the email message, a header of the email message, and a domain of a sender of the email message. The source may be precise and indicate an individual sender or the source may actually be a plurality of sources such as all senders from a domain.

If the source of the email message is contained in the suspect list 110, the email message is removed from the mailbox 103 at 208. Alternatively, if the source of the email message is contained in the suspect list 110, the email message is moved to a suspect folder of the user or displaying the email message to the user to indicate the determined source of the identified email message is contained in the suspect list of sources (e.g., prefixing a subject line of the email message). At, 210, it is determined if there are more unseen email messages in the inbox 104. If so, steps 206 and 208 are repeated for each unseen email message identified at 204. If not, the method terminates at 212.

Other embodiments include the inbox filter 108 identifying unseen email messages in response to receiving a command from the user or in response to receiving a request from the user to access the inbox 104. For example, the inbox filter 108 may be configured to periodically identify email messages that have not been unseen by the user during periods when the inbox 104 is not accessed or the inbox filter 108 may configured to identify unseen email messages in response to a user command. In yet another embodiment, the inbox filter 108 may be configured to identify email messages that have not been seen in response to receiving a request from the user to login to the inbox 104. Advantageously, if the inbox filter 108 executes steps 204-210 after receiving the login request from the user and before the user accesses the inbox 104, the user experience remains consistent because no email messages are removed from the inbox 104 while the user is accessing the inbox 104.

Other alternative embodiments include executing steps 204-210 in response to monitoring at 214 the user's actions relative to the mailbox 103. For example, steps 204-210 are executed if the monitoring indicates at 216 that the user has not read an email message in the mailbox 103 of the user for a period of time, that the user has not composed a new email message or deleted an email message in the mailbox 103 for a period of time, that user is no longer accessing mailbox 103, and the like.

FIG. 3 is an exemplary flow diagram for a method reviewing a plurality of email messages in an unaccessed mailbox 103 of a user. The plurality of email messages are associated with one or more sources. At 302, the suspect list component 109 maintains a suspect list 110 of sources indicating a source of the email message is not desirable. And at 304, the inbox filter 108 identifies each email message stored in an unaccessed inbox 104 of the user. An unaccessed mailbox 103 includes inboxes which are not opened, not logged into, or not otherwise accessed.

At 306, the inbox filter 108 determines if the source of the email message is contained in the suspect list 110 of sources. And, at 308, the inbox filter 108 moves the email message to a suspect folder 112 when the determined source of the email message is contained in the suspect list 110 of sources. Alternatively, if the source of the email message is contained in the suspect list 110, the email message is moved to a junk folder of the user or deleted from the mailbox 103 of the user. At, 310, it is determined if there are more unread email messages in the mailbox 103. If so, steps 306 and 308 are repeated for each email message identified at 304. If not, the method terminates at 312.

In an alternative embodiment, the inbox filter 108 determines each email message stored in an unaccessed inbox 104 of the user periodically during periods when the mailbox 103 is not accessed. In another alternative, the inbox filter 108 determines each email message stored in an unaccessed mailbox 103 of the use in response to a user command. In yet another alternative, the inbox filter 108 determines each email message stored in an unaccessed mailbox 103 of the user in response to receiving a request from the user to access the mailbox 103 of the user.

In another embodiment, the inbox filter 108 determines a state of each email message in the inbox. In response to the determined state indicating that the email message has not been previously read by the user, the inbox filter 108 determines if the source of the email message is contained in the suspect list 110 of sources occurs. And, in response to the determined state indicating that the email message has been previously read by the user, the inbox filter 108 determines if the source of the email message is contained in the suspect list 110 of sources.

Referring again to FIG. 1, one example of a general purpose computing device in the form of an email server 102 is illustrated. In one embodiment of the invention, computers such as the email server 102 are suitable for uses other than those illustrated and described herein. The email server 102 has one or more processors or processing units and a system memory The email server 102 typically has at least some form of computer readable media. Computer readable media, which include both volatile and nonvolatile media, removable and non-removable media, may be any available medium that may be accessed by email server 102. By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage, or any other medium that may be used to store the desired information and that may be accessed by email server 102.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The email server 102 may also include other removable/non-removable, volatile/nonvolatile computer storage media. For example, FIG. 1 illustrates an inbox filter 108 that reads from or writes to non-removable, nonvolatile magnetic media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The email server 102 may operate in a networked environment using logical connections to one or more remote computers, such as a remote computer (e.g., source-1 114, source-2 116, source-3 118). The remote computer (e.g., source-1 114, source-2 116, source-3 118) may be a personal computer, a server, a router, a network PC, a peer device or other common network node, and typically includes many or all of the elements described above relative to email server 102. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of email server 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage.

In operation, email server 102 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of reviewing email messages after delivery to an inbox of a user, said inbox being associated with a mailbox, comprising:
   maintaining a suspect list of sources, the sources being undesirable based on user complaints and feedback loops;
   determining a read/view state of each email message;
   identifying, based on said determined state, each email message that has not been accessed by the user and that is stored in the inbox of the user;
   determining the source of each of the identified email messages that has not been accessed; and
   when the user is not active in the mailbox, removing each identified email message that has not been accessed from the mailbox when the determined source of the identified email message that has not been accessed is contained in the suspect list of sources.

2. The method of claim 1 wherein said identifying occurs periodically during periods when the mailbox is not being accessed by the user.

3. The method of claim 1 wherein said identifying occurs in response to a user command.

4. The method of claim 1 wherein the identifying occurs in response to receiving a request from the user to access the mailbox of the user.

5. The method of claim 1 wherein the identifying occurs periodically in response to receiving a command from the user.

6. The method of claim 1, further comprising:
   monitoring the user's actions relative to the mailbox; and
   wherein said identifying occurs in response to the monitoring indicating that the user has not read an email message in the inbox of the user for a period of time.

7. The method of claim 1 further comprising:
   monitoring the user's actions relative to the mailbox; and
   wherein said identifying occurs in response to the monitoring indicating that the user has not composed a new email message or deleted an email message in the inbox for a period of time.

8. The method of claim 1 further comprising:
   monitoring the user's actions relative to the inbox; and
   wherein said identifying occurs periodically in response to the monitoring indicating that user is no longer accessing the inbox.

9. The method of claim 1, wherein the suspect list is based on a reputation of the source and the reputation of the source is based on one or more of the following: user complaints, feedback loops or anti-spam technology indicating the message is spam, antivirus technology indicating the message contains a virus, feedback loops or image recognition technology indicating the message contains pornography, feedback loops or antiinfringement technology indicating the message contains unauthorized copyrighted material, and feedback loops or anti-phishing technology indicating the message contains a phishing attack.

10. The method of claim 1, wherein determining the source associated with the email message is based on one or more of the following: an IP address associated with the email message, a URL contained in the email message, a subject of the email message, a source of the email message, keywords in the email message, hashes of all of a subset of the email message, a header of the email message, and a domain of a sender of the email message.

11. A method of reviewing a plurality of email messages after delivery to a mailbox of a user, said mailbox including an inbox, said plurality of email messages being associated with a source, comprising:
    maintaining a suspect list of sources indicating a source of the email message is not desirable based on user complaints and feedback loops;
    determining a read/view state of each email message;
    identifying, based on said determined state, each email message that has not been accessed by the user and that is stored in an unaccessed mailbox of the user;
    for each identified email message that has not been accessed by the user:
      determining if the source of the identified email message is contained in the suspect list of sources;
      moving the identified email message to a suspect folder when the determined source of the identified email message is contained in the suspect list of sources and when the user is not active in the mailbox; and
      retaining the identified email message in the inbox when the determined source of the identified email message is not contained in the suspect list of sources.

12. The method of claim 11 wherein the determining occurs periodically during periods when the inbox is not accessed.

13. The method of claim 11 wherein the determining occurs in response to a user command.

14. The method of claim 11, wherein the determining occurs in response to receiving a request from the user to access the mailbox of the user.

15. The method of claim 11, further comprising:
    determining a state of the email message;
    wherein said determining if the source of the email message is contained in the suspect list of sources occurs in response to the determined state indicating that the email message has not been previously read by the user; and
    wherein said determining if the source of the email message is contained in the suspect list of sources does not occur in response to the determined state indicating that the email message has been previously read by the user.

16. A system for reviewing email messages after delivery to a mailbox, said system comprising a system memory storing computer-executable components, said components comprising:
an email receipt component for receiving a plurality of email messages and storing said plurality of email messages in the mailbox of the user;
a suspect list component for maintaining a suspect list of sources wherein the reputation of source is undesirable based on user complaints and feedback loops;
an inbox filter for:
monitoring the user's actions relative to the mailbox while the user is accessing the mailbox; and
when the monitoring indicates that the user is not active in the mailbox for a period of time, then:
determining a read/view state of each email message;
identifying, based on said determined state, each email message stored in the mailbox of the user which has not been seen, displayed, previewed, opened, or otherwise accessed by the user; and
determining the source of each of the identified email messages; and
displaying each identified email message to indicate to the user that the determined source of the identified email message is contained in the suspect list of sources.

17. The system of claim 16 wherein the identifying occurs periodically in response to receiving a command from the user.

18. The system of claim 16 wherein said identifying occurs in response to the monitoring by the mailbox filter indicating that the user has not composed or deleted an email message in the inbox of the user for a period of time.

19. The system of claim 16 wherein said identifying occurs periodically in response to the monitoring by the inbox filter indicating that user is no longer accessing the mailbox.

20. The system of claim 16, wherein determining the source of each of the identified unread email messages by the inbox filter is based on one or more of the following: an IP address associated with the email message, a URL contained in the email message, a subject of the email message, a source of the email message, keywords in the email message, hashes of a subset or all of the email message, value of a header of the email message, and a domain of a sender of the email message.

* * * * *